United States Patent
Shkurikhin et al.

(10) Patent No.: US 10,409,148 B2
(45) Date of Patent: Sep. 10, 2019

(54) RGB PROJECTOR WITH MULTI-LASER BROADBAND LIGHT SOURCE AND SYSTEM FOR DYNAMICALLY CONTROLLING IMAGE CONTRAST RATIO

(71) Applicant: IPG PHOTONICS CORPORATION, Oxford, MA (US)

(72) Inventors: Oleg Shkurikhin, Shrewsbury, MA (US); Alexey Avdokhin, Southborough, MA (US); Andrei Babushkin, Worcester, MA (US); Yuri Erokhin, Charlton, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 15/805,785

(22) Filed: Nov. 7, 2017

(65) Prior Publication Data
US 2018/0203339 A1 Jul. 19, 2018

Related U.S. Application Data

(60) Provisional application No. 62/419,185, filed on Nov. 8, 2016.

(51) Int. Cl.
| | |
|---|---|
| *G03B 21/20* | (2006.01) |
| *G02B 27/48* | (2006.01) |
| *H04N 9/31* | (2006.01) |
| *G03B 33/10* | (2006.01) |
| *G03B 21/00* | (2006.01) |

(Continued)

(52) U.S. Cl.
CPC ......... *G03B 21/2053* (2013.01); *G02B 27/48* (2013.01); *G03B 21/008* (2013.01); *G03B 21/2013* (2013.01); *G03B 21/2033* (2013.01); *G03B 33/10* (2013.01); *H01S 3/06754* (2013.01); *H01S 3/1095* (2013.01); *H04N 9/3123* (2013.01); *H04N 9/3155* (2013.01); *H04N 9/3161* (2013.01); *H04N 9/3164* (2013.01); *H04N 9/3194* (2013.01)

(58) Field of Classification Search
CPC .............. G03B 21/2053; G03B 21/008; G03B 21/2013; G03B 21/2033; G03B 33/10; G02B 27/48; H04N 9/3161; H04N 9/3155; H04N 9/3164; H04N 9/3194; H04N 9/3123; H01S 3/1095; H01S 3/06754
USPC .......................................................... 353/31
See application file for complete search history.

(56) References Cited

U.S. PATENT DOCUMENTS

| | | | | |
|---|---|---|---|---|
| 2007/0035707 A1* | 2/2007 | Margulis | ............... | G03B 21/26 353/122 |
| 2010/0194769 A1* | 8/2010 | Mori | ...................... | G09G 3/22 345/589 |

(Continued)

*Primary Examiner* — Steven Whitesell Gordon
*Assistant Examiner* — Jerry L Brooks
(74) *Attorney, Agent, or Firm* — Yuri Kateshov, Esq.; Timothy J. King, Esq.

(57) ABSTRACT

A high dynamic range projector (HDRP) is configured with at least one spatial light modulator having red, green and blue digital light projector (DPL) chips, a light laser source including red, green and blue (RGB) light laser systems which are operative to illuminate respective DLP chips; and a central processing unit (CPU) coupled to the DLP engines and respective RGB light laser systems, wherein the CPU is operative to determine an optimal average power of each of the RGB light laser systems at a frame rate based on a desired contrast ratio.

8 Claims, 1 Drawing Sheet

(51) Int. Cl.
*H01S 3/067* (2006.01)
*H01S 3/109* (2006.01)

(56) References Cited

U.S. PATENT DOCUMENTS

| | | | | |
|---|---|---|---|---|
| 2013/0169659 A1* | 7/2013 | Guthrie | ................ | H04N 9/3155 345/589 |
| 2014/0133024 A1* | 5/2014 | Lippey | .................. | H01S 3/2391 359/464 |
| 2015/0036105 A1* | 2/2015 | Ide | ....................... | H04N 9/3129 353/31 |
| 2015/0219986 A1* | 8/2015 | Gapontsev | ......... | G03B 21/2013 353/31 |

\* cited by examiner

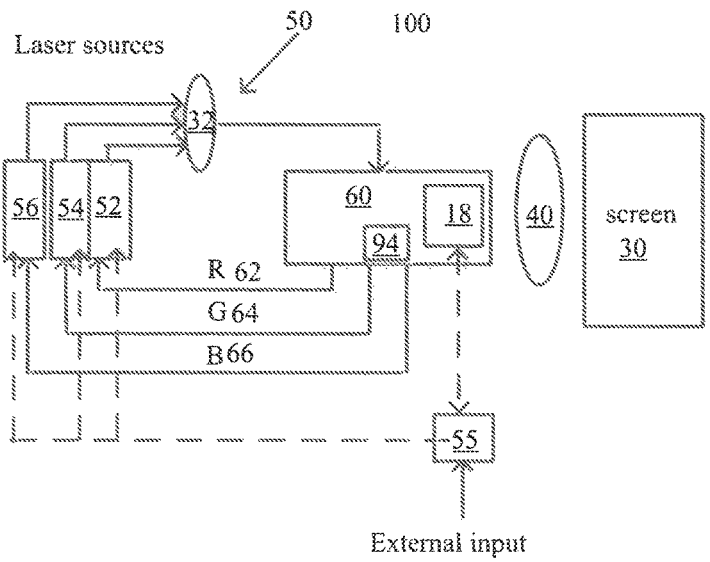
FIG. 1
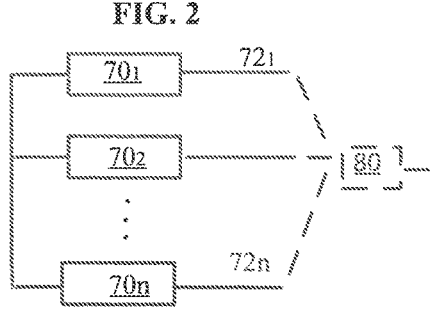
FIG. 2
FIG. 3
FIG. 5
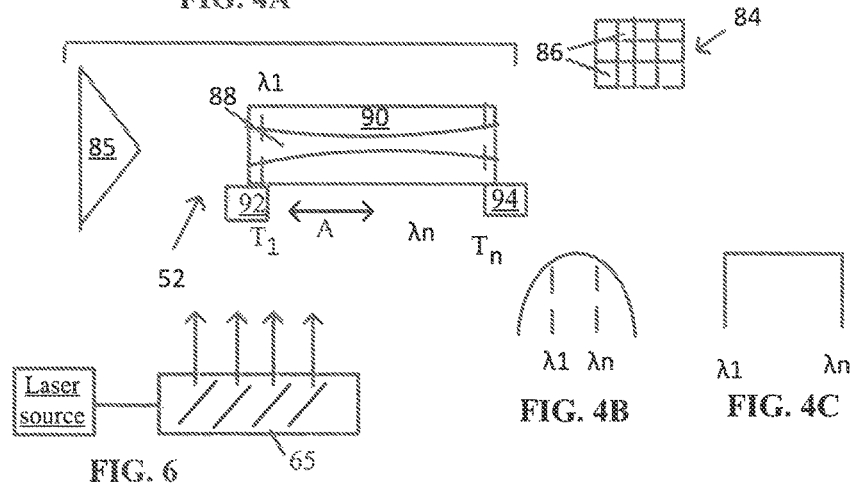
FIG. 4A
FIG. 4B
FIG. 4C
FIG. 6

RGB PROJECTOR WITH MULTI-LASER BROADBAND LIGHT SOURCE AND SYSTEM FOR DYNAMICALLY CONTROLLING IMAGE CONTRAST RATIO

BACKGROUND OF THE DISCLOSURE

Field of the Invention

This disclosure relates to RGB (red, blue and green) projectors with multi-laser light source. In particular, the disclosure relates to individually controlled broadband fiber red and green, and blue diode lasers contributing to speckle reduction, and further to laser beam delivery system for dynamically controlling image contrast ratio.

Prior Art Discussion

Demand for high-quality projection displays keeps growing, both from consumers and the creative industry looking to push image quality and maximize the cinematic experience. One of the main efforts the cinematic industry is directed to improving the image brightness and contrast. Recently powerhouse cinema and projector companies have turned to laser technology. The use of laser-based projectors provides brighter images with a wider color gamut and a higher contrast ratio at a lower cost of ownership, including increased lifetime, over traditional projectors with Xenon bulbs. However just improving the brightness of a display can wash out the dark tones and turn them into a medium grey. As a result, in addition to new laser light sources, the industry needed a significant expansion of the image contrast which is the ratio of intensities of the lowest part of the scene brightness to maximum brightness portion of the scene. In other words, as the contrast expands, images may more faithfully represent real-world scenes. This need was partly satisfied by projection displays utilizing a high dynamic range (HDR) technique.

The advanced HDR display designs are based on Digital Light Projector (DLP) which allows dynamic ranges well beyond 50,000:1 and claimed to be as high as 1000000:1. The DLP projectors are based on a DLP chip—a digital micromirror device (DMD)—comprised of up to a few millions of tiny mirrors, no wider than one-fifth the width of a human hair. Each mirror in this chip is capable of independent adjustment, changing its angular position with respect to the light source, to create a dark or light pixel. At this point, however, the image is in grayscale. Color is fed to the DMD by a beam of light that passes through a spinning prism before it reaches the chip. Each segment of the prism delivers one color. Originally only basic colors red, blue, and green were supported. In more advanced systems, prisms support cyan, magenta, and yellow in addition to the original colors. While these chips can create up to 16.7 million colors, a DLP projector with a three-chip architecture can deliver up to 35 trillion colors. After color reaches the DMD, the image is fed through the lens and onto the projection screen.

During the production stage, the camera video information is processed by computer-based processing unit of the HDR projector display. Generally it is done by inputting image signals based on various standards that are initially stored in a camera control unit which has an image conversion unit or scaler. The scaler integrates input image signals as image signals having a projection format, stores such signals in a video RAM, and then transmits them to a processing unit. The processing unit uses each transmitted image signal to drive a reflective micro-element based on a frame rate conforming to a predetermined format, for example, 60 frames per second, a division number for color components, and higher-speed time-sharing driving with a display gradation number being multiplied.

In practical terms, the processing unit is designed to enhance the contrast based on the data transferred from a camera. The operation of the unit is thus based on a certain algorithm governing the output of the laser-based light source and selective "on", "off" positions of DMDs. However, in some of the known HDR projectors, a laser-based light source does not necessarily operate efficiently which leads to a relatively short useful life of the source, high maintenance cost and other known disadvantages. Therefore it is desirable to optimize the operation of the laser-based light source in HDR projectors.

Furthermore, at least some of the HDR projectors operate such that videographers, filmmakers and others have no means for altering the output of laser sources to change the preprogrammed contrast in accordance with his/her creative vision. It is therefore desirable to provide HDR displays with a contrast improving scheme allowing movie makers to modulate the intensity of the laser-based light source.

BRIEF DESCRIPTION OF THE DRAWINGS

FIG. 1 is a diagrammatic view of the inventive concept of HDR including the modulation of the laser source output.

FIG. 2 illustrates one configuration of an RGB laser-based light source.

FIG. 3 illustrates another configuration of the laser-based light source.

FIGS. 4A-4C illustrate the architecture and operational principle of the disclosed green light fiber laser system.

FIG. 5 illustrates a diagrammatic end view of DMD chip.

FIG. 6 illustrates a schematic of optical scheme including one or multiple light sources of FIG. 1-3 powering several displays.

SPECIFIC DESCRIPTION

FIG. 1 illustrates a HDR projection display system 50 which is provided with a control channel between each of red, green and blue laser sources 52, 54 and 56, respectively, and control unit 18 of HDR projector 60 allowing the operator to modulate the output of each of the sources in order to alter, if desired, the brightness of the image originally created in accordance with the on-board algorithm.

In particular, disclosed display 50 is operative to alter the lasers' operation in accordance with any given video frame—one of many individual still images composing the complete moving picture, as well as between consecutive frames. This can be realized by using a controller 55 coupled to the input of laser systems 52, 54 and 56 and altering intensity of each or any combination of the lasers' output in response to the external signal into controller 55. Once the contrast ratio meets the requirements of the filmmaker, for example, the altered intensity is stored in control processing unit 18 of HDR projector 60. The latter has at least one light modulator, but also may be configured with two light modulators each including three DLP engines which correspond to respective primary red, green and blue colors.

Briefly reviewing the operation of HDR display 50, two or all three laser systems emit respective output beams which are then combined into white light that undergoes homogenization in a rectangular integrator rod outputting a homogenized combined beam. The homogenized beam is then incident on a Philips prism where it is split into red, green and blue components. The components illuminate respective DLP engines each forming the image for corresponding color in an array of pixels. The fractions of respective incident light components, which are reflected from respective DLP engines may be further recombined for further contrast enhancement and/or directly projected through lens 40 on screen 30.

In some RGB displays, there are $2^{16}$ or 65,636 and even higher possible levels for each primary color. Typically, a frame having uniform white or black color rarely occurs compared to frames containing multicolored images. The contrast of these colored images requires mixing together two or three of primary colors of light with varying degrees of light intensity determined by the algorithm operating controller 18 which positions respective DMDs in the desired on, off and in between positions.

Any given frame or image typically has the brightest and the darkest points determined by a known sensor system 100. As known, even when DMD is in the "off" position and does not reflect light, the latter still leaks onto the screen. Nobody is really surprised to see the should-be-black screen with traces of light colors because of the light leakage. However, the inventive concept allows, for example, considerably reduce unwanted light traces on dark frames by reducing the output intensity of selective laser or lasers or completely turning unnecessary laser systems off in accordance with any given frame. All necessary information regarding the intensity of each laser system for any given frame is stored in controller 18 and used to automatically lower/increase the output intensity of the source by means of feedback loops R, G and B 62, 64 and 66 respectively at the time thus edited frame is to be imaged on screen 30.

The laser systems 52, 54 and 56 operate in a pulsed regime and can be selectively controlled to output pulses synchronously with the displacement of the mirrors to the "on" or "off" position. As discussed in detail below, red and green fiber systems 52, 54 respectively operate at a pulse repetition rate considerably exceeding frame rate. Typically, the duration of each frame is about 15 µs which is substantially greater than a pulse repetition rate. The frame and pulse repetition rate difference contributes to the enhanced dynamic contrast ratio control, as explained immediately below.

The above can be better understood in conjunction with FIG. 5 illustrating DLP chip 84. Assume that only a fraction of DMDs 86, which are located, for example, at the bottom of chip 84, require being in the "on" position. It is possible to operate the pulsed source or sources of the fiber systems such that the fiber laser system outputs a pulse or pulses synchronously with displacement of the required DMDs to the "on" position in accordance with the command from controller 18. Such synchronous operation of DMDs and pulsed light sources of fiber systems 52-56, respectively, can be easily established by controlling a duty cycle of the pulsed light sources o respective fiber systems. Besides the preprogrammed synchronization, the operator can manually rewrite the program by using external input 55 and alter the predetermined contrast ratio. The modulation of fiber laser system's output is controlled such that frequency conversion efficiency of light in each of green, red and blue systems does not suffer.

Each frame, unless the complete darkness is required, always has the brightest point which, typically, is lower than the maximum possible brightness corresponding to the on position of all DMDs of the chip. This allows the optimization of the laser operation in accordance with any given frame. The data received from camera by controller 18 of projector 60 includes the number of "on" positioned DMDs at each DLP for each frame and respective DMDs in the off position to provide the desired contrast. Frequently, however, the output power of light laser sources is maintained at a constant level or level above the required minimum that can provide the required contrast ratio. Such an operation of laser can detrimentally affect its functionality and cost of maintenance.

To minimize the above-discussed disadvantages, controller 18 is operative to determine a minimal average power of all or selective laser systems 52-56 necessary to obtain the desired contrast ratio between the determined brightest and darkest pixels on any given frame which in turn are determined by known to the artisan means 94. Once the minimal average power for the calculated ratio is determined, controller 18 is operative to controllably reduce the average output power of all or selective laser systems at a frame rate. The disclosed structure and method help lower the operating temperature and decrease power consumption of laser sources which all lead to their longer useful life and low cost maintenance.

The structure of FIG. 1 also has an external input 55 accessible by the moviemaker. Sometime it is desirable to overwrite the preprogrammed or newly determined output of the laser systems. With the input 55, the filmmaker can manually modulate the output intensity in accordance with his/her creative vision to obtain the desired ratio which can be further stored in CPU 18.

Preferably, the disclosed light source includes fiber red, green and blue laser systems 52, 54 and 56, respectively. However, the scope of the disclosure is not limited only to fiber systems and may include a combination of diode, fiber and other laser configurations. For example, blue laser system 56 is preferably based on diode lasers whereas red and green laser systems 52, 54 may be fiber laser-based systems. The fiber laser systems are configured to output pulsed light guided to projector 60 via a delivery fiber train. Each of laser systems 52-56 may have one or more laser modules each including only a fiber oscillator, but typically featuring a master oscillator power fiber amplifier (MOPFA) architecture.

FIG. 2 illustrates one configuration of the disclosed light source in which selected fiber laser systems 52-56 each include a plurality of modules $70_1$-$70n$ having respective delivery fibers $72_1$-$72n$. The modules, emitting light of uniform color light, are controlled by controller 18 operative to reduce the output intensity of some or all modules or completely shut them down if the given frame requires it.

FIG. 3 illustrates another configuration of the disclosed light source in which selected fiber laser systems 52-56 each include a single module 74. However, the output from module 74 may be selectively guided to projector 60 through multiple delivery fibers $72_{1-n}$. The distribution of light among delivery fibers 72 may be realized by means of a scanner 76 operated by controller 18 which synchronizes the operation of the scanner with the on/off position and location of selected DMDs.

The schemes of the disclosed laser source shown in FIGS. 2 and 3 each may additionally have a fiber combiner 80 with an output fiber 82 guiding cumulative light from multiple fibers $72_{1-n}$ to projector 60 of FIG. 1. Like configurations of FIGS. 2 and 3 without combiner, the schemes with the combiner operate such that light of the same color may be guided along selective delivery fibers $72_{1-n}$ before it is coupled into single output fiber 82.

Returning to the above-discussed FIG. 5, in any of the configurations of respective FIGS. 2 and 3 in the modification without combiner 80, the output ends of respective delivery fibers 72 guiding the same color may be directly juxtaposed with corresponding DMD chip 84. Using the flexibility of the control circuitry of FIG. 1, the light of the same color may be guided only by those fibers 72 which are opposed to the desired segment of chip 84. This feature can be used in addition to the synchronized operation of DMDs and light sources.

Fiber lasers are known for long lifetime and high wall-plug efficiency, ultra-high spatial brightness, and deliver powers from a very small spot in a nearly collimated beam. These unique optical properties enable key capabilities for cinema and ultimately for new kinds of laser lighting: the ability to input nearly unlimited amounts of RGB light into digital projectors and the ability to deliver kilowatts of visible light via efficient, flexible optical fibers. Another distinctive feature of fiber lasers is their inherently narrow band which contributes to the perception of fully-saturated colors.

Unfortunately, narrow band light incident on random rough surfaces (such as a projection screen 30) also introduces an unacceptable image artifact known as "speckle". The visual effects of speckle detract from the aesthetic quality of an image and also result in a reduction of image resolution. Consequently, in the context of high resolution display systems, it is generally deemed essential that speckle be eliminated. Ideally, the spectral bandwidth for a projection display light source should be on the order of several nanometers with a minimal of 4 nm and desirably as broad as about 20 nm. Such a light source could be considered quasi-monochromatic sufficiently broadband for the cancellation of speckle yet sufficiently narrow band for color purity. The disclosed light source is configured to output broad line radiation which minimizes the speckle effect as disclosed below.

As known, the frame rate is at most 120 frames per second. In fact the frame rate is typically not higher than 60 fps or 60 Hz. This is much lower than the frequency at which the laser output may be modulated which usually are in a KHz and higher frequency ranges. Such a high frequency may even allow a complete shutdown of laser sources between consecutive frames. Again, iota by iota, the efficiency of the sources increases which is a decisive advantage in highly competitive film and display industries.

Still a further light source modification includes the use of one high power fiber laser source powering several HDR displays via a beam switch assembly 65, as shown in FIG. 6. This architecture can be particular suitable for a theme park. The use of multiple displays with a single laser source of FIGS. 1-3 can be realized by utilizing a beam switch.

As known, ions of rare earth metals, which are typically used as light emitting ions in fibers, emit light in respective predetermined wavelength ranges. If the desired wavelength range is outside a naturally available range of any given type of light emitting ions, additional techniques are used. For example, each of red, green and blue wavelength ranges can be obtained by using a frequency conversion technique.

FIG. 4A diagrammatically illustrates one modification of Green fiber laser system 52 configured in accordance with the disclosure. A fiber laser pump 85 preferably has a MOPFA architecture outputting pulsed broadband light in a 1 micron range, such as 1064 μm—typical for ytterbium (Yb) ions, and good $M^2$ factor of less than 2 and preferably less than 1.1. The broadband light with a line width between 1 and 30 nm is incident on a second harmonic generator (SHG) including a non-critically phase matched nonlinear crystal 90, such as lithium borate (LBO), which is controllably positioned to have the beam's waste within the crystal. The output of crystal 90 includes a broadband Green light with a spectral line width $\lambda 1$-$\lambda n$ of up to 10 and even 15 nm centered at about 532 nm wavelength.

The frequency conversion bandwidth can be induced by creating a constant temperature gradient along substantially the entire length of crystal 90. The phase-matching wavelength of crystal 90 depends on the crystal temperature. When a constant temperature gradient is imposed within the crystal, the phase-matching conditions for different wavelength defining the $\lambda 1$-$\lambda n$ range are met at different locations along the crystal which provides the broad conversion bandwidth. The latter more than adequately suppresses speckles.

The desired temperature gradient Tn-T1 can be realized by implementing two thermoelectric coolers (TEC) 92, 94 respectively that are controlled by controller 18 of FIG. 1 so as to maintain the desired temperature gradient regardless of the ambient conditions. With the temperature T1 being higher than Tn, the converted wavelengths increase from $\lambda 1$ to $\lambda n$.

The beam from laser pump may have a bell shape as shown in FIG. 4B. However, the line width $\lambda 1$-$\lambda n$ is somewhat smaller than that of a flat-top beam of FIG. 4B. In many instances, the flat-top beam is thus preferred. The converted wavelength band can be controlled by displacing TECs 92 and 94 along double arrow A by any suitable means. Currently, crystals 90 may have the length of up to 5 mm, but longer crystals are on a way to be tested.

Another configuration of the green fiber laser system is disclosed in WO20150916 ('916) co-owned with the present application and fully incorporated herein by reference. The red fiber laser source can have a configurations which is also disclosed in WO '916 and fully incorporated herein by reference.

Although the present disclosure has been described in terms of the disclosed example, numerous modifications and/or additions to the above-disclosed embodiments would be readily apparent to one skilled in the laser arts without departing however from the scope and spirit of the following claims.

The invention claimed is:

1. A high dynamic range projector (HDRP) comprising;
at least one spatial light modulator having red, green and blue digital light projector (DLP) chips;
a light laser source including red, green and blue (RGB) pulsed light laser systems operative to illuminate respective DLP chips, the green light laser system including
a pump outputting a pulsed broadband light beam having a 1 to 20 nm bandwidth,
a second harmonic generator (SHG) receiving the broadband light beam, and
multiple thermoelectric coolers operating to impose a temperature gradient within a nonlinear crystal of the SHG so as to provide phase-matching conditions for a plurality of wavelengths within the bandwidth of the broadband light beam along substantially an entire length of the nonlinear crystal, wherein green light beam from the nonlinear crystal has a broad conversion bandwidth substantially half the bandwidth of the pump broadband light beam and sufficient to suppress speckles on a screen;

a sensor system operative to detect brightest and darkest pixels on each frame and generate respective signals; and a central processing unit (CPU) coupled to the DLP chips, sensor system, and respective RGB light laser systems, wherein the CPU is operative to determine a desired contrast ratio based on the signals generated by the sensor system and an optimal average power of each of the RGB light laser systems at a frame rate which is based on the desired contrast ratio, the RGB light laser systems each being operative to output pulses synchronously with displacement of selective digital micro mirrors of the corresponding light laser system to an "on" position.

2. The HDRP of claim 1 further comprising a control channel receiving an external input from a filmmaker and operative to modulate an output of the light laser source so as to alter the desired contrast ratio.

3. The HDRP of claim 1, wherein at least the red and green light laser systems are each configured to have a master oscillator power fiber amplifier (MOPFA) architecture.

4. The HDRP of claim 3, wherein the red and green light laser systems each include a single MOPFA module and a plurality of delivery fibers.

5. The HDRP of claim 3, wherein the red and green light laser systems each include multiple MOPFA modules each MOPFA module provided with a delivery fiber.

6. The HDRP of claim 4 or 5 further comprising a fiber combiner combining output ends of the delivery fibers into a single system output fiber.

7. The HDRP of claim 1, wherein the broadband light beam from the pump has a bell-shape or flat top shape.

8. The HDRP of claim 1, wherein the CPU is operative to completely de-energize the light laser source between consecutive images.

* * * * *